US009026527B2

(12) United States Patent
Wallace et al.

(10) Patent No.: US 9,026,527 B2
(45) Date of Patent: *May 5, 2015

(54) REVERSE GEO-CODING FOR TRACK PATH

(71) Applicant: Apple Inc., Cupertino, CA (US)

(72) Inventors: Alexander David Wallace, Sunnyvale, CA (US); Tim Cherna, San Francisco, CA (US); Eric Hanson, Emeryville, CA (US); Nikhil Bhatt, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/856,274

(22) Filed: Apr. 3, 2013

(65) Prior Publication Data

US 2013/0287253 A1    Oct. 31, 2013

Related U.S. Application Data

(63) Continuation of application No. 12/868,607, filed on Aug. 25, 2010, now Pat. No. 8,433,707.

(60) Provisional application No. 61/237,250, filed on Aug. 26, 2009.

(51) Int. Cl.
*G06F 17/30* (2006.01)
*G06T 7/00* (2006.01)
*G01S 5/16* (2006.01)

(52) U.S. Cl.
CPC . *G06T 7/004* (2013.01); *G01S 5/16* (2013.01); *G06F 17/30265* (2013.01)

(58) Field of Classification Search
None
See application file for complete search history.

(56) References Cited

U.S. PATENT DOCUMENTS

| 2003/0122839 | A1 | 7/2003 | Matraszek |
| 2005/0104976 | A1 | 5/2005 | Currans |
| 2008/0069449 | A1 | 3/2008 | Cho |
| 2009/0010491 | A1 | 1/2009 | Ko |
| 2009/0324058 | A1 | 12/2009 | Sandage |
| 2009/0327229 | A1 | 12/2009 | O'Connor |

(Continued)

OTHER PUBLICATIONS

Tsai et al., 'Extent: Inferring Image Metadata From Context and Content', Department of Electrical & Computer Engineering and Computer Science, UC Santa Barbara, IEEE 2005, 4 pages.

(Continued)

*Primary Examiner* — Belix M Ortiz Ditren
(74) *Attorney, Agent, or Firm* — Wong, Cabello, Lutsch, Rutherford & Brucculeri, LLP

(57) ABSTRACT

Methods and systems are disclosed for associating non-geographical information to track paths. Among other things, meaningful labels for the track paths can be formulated. In one aspect, a method performed by an application executing on a computer system includes receiving a set of images taken during a trip, a corresponding set of acquisition times, and a track path of the trip. The method further contains identifying landmarks near the received track path. Furthermore, the method includes receiving from a human user of the application a landmark selection from the identified landmarks and one or more image selections from the received set of images. In response to receiving the human user's selections, the method can associate the one or more selected images with the selected landmark. Additionally, the method included matching the received set of images to the received track path based on the association.

19 Claims, 9 Drawing Sheets

(56) References Cited

U.S. PATENT DOCUMENTS

| | | | |
|---|---|---|---|
| 2010/0284566 A1* | 11/2010 | Hisatomi et al. | 382/103 |
| 2011/0052073 A1 | 3/2011 | Wallace | |
| 2011/0055283 A1 | 3/2011 | Wallace | |
| 2011/0055284 A1 | 3/2011 | Wallace | |

OTHER PUBLICATIONS

Wang et al., 'Method and Apparatus for Geo-named Object Identification', IP.com Prior Art Database, IPCOM000134145D, Feb. 24, 2006, 8 pages.

* cited by examiner

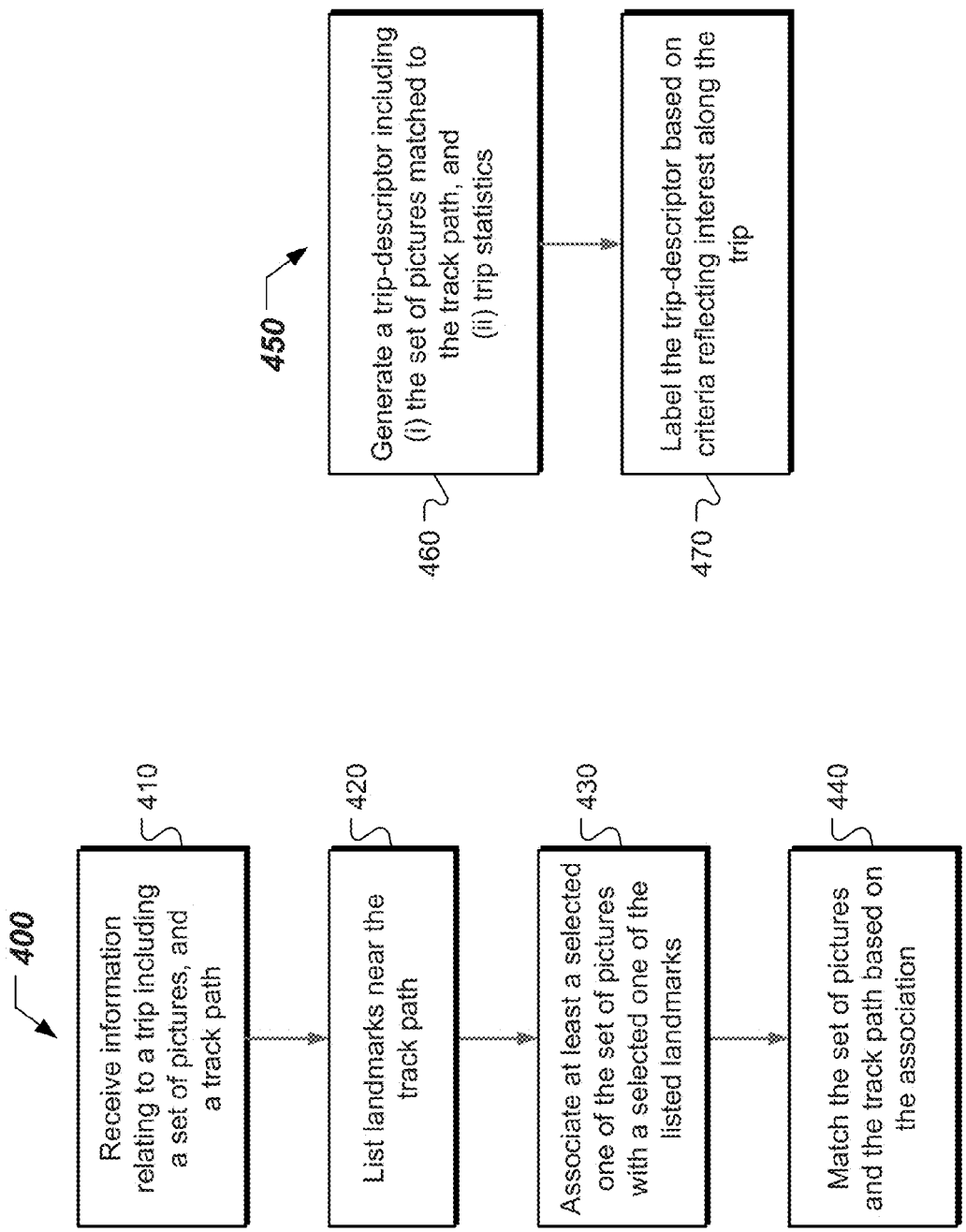

REVERSE GEO-CODING FOR TRACK PATH

TECHNICAL FIELD

This subject matter is related to associating non-geographical information with points along a geographical track path.

BACKGROUND

As Global Positioning System (GPS) tracking devices have become ubiquitous, it is common for a trail hiker, biker, etc., to take along such a device to generate a track path of a trip—that is, the geographical route that the hiker or biker took over a specified period of time. The hiker turned story teller can later present such a track path to family and friends to share memorable moments during the trip. A presentation may include overlaying a representation of the track path over a map of a region that encompasses the track path. Certain locations displayed on the map near the track path may jog the story teller's memory about events of the trip that occurred at or near such locations. The more recent the trip relative to the time of the presentation, the more details may be remembered by the story teller to share about the trip associated with the track path.

SUMMARY

Techniques and systems to associate non-geographical information to track paths are disclosed. Among other things, meaningful labels for the track paths can be formulated.

In one aspect, a method performed by an application executing on a computer system includes receiving a set of images taken during a trip, a corresponding set of acquisition times, and a track path of the trip. The method further contains identifying landmarks near the received track path. Furthermore, the method includes receiving from a human user of the application a landmark selection from the identified landmarks and one or more image selections from the received set of images. In response to receiving the human user's selections, the method can associate the one or more selected images with the selected landmark. Additionally, the method included matching the received set of images to the received track path based on the association.

Implementations can optionally include one or more of the following features. A trip-descriptor that includes trip statistics can be generated. The trip-descriptor can be labeled based on criteria reflecting interest along the trip. The labeling can include formulating a trip-descriptor title in terms of at least an identified landmark. The trip-descriptor can further include the set of images matched to the track path. Generating the trip-descriptor can include aggregating the set of images matched to the track path and the trip statistics into a trip-descriptor data structure on a storage device, and storing pointers to the trip-descriptor data structure in a relational database. For each one of the set of images matched to the track path, an image can be associated with an identified landmark if the image was acquired at a distance smaller then a predetermined distance from the identified landmark.

An identified landmark having a largest number of associated images can be determined. A trip-descriptor title can be formulated in terms of the determined landmark. An identified landmark having associated images taken over a longest time interval can be identified. A trip-descriptor title can be formulated in terms of the determined landmark. A mode of transportation used during the trip can be inferred based on an average rate of the track path. A trip-descriptor title can be formulated based on the inferred mode of transportation during the trip. A time spent at each landmark can be identified. An identified landmark at which the largest amount of time was spent can be identified. A trip-descriptor title can be formulated in terms of the determined landmark.

The trip statistics can include one or more of: landmarks associated with the trip; an inferred mode of transportation during the trip; a total number of images taken during the trip; a number of images taken at each stop; a number of images taken at each landmark; a time spent at each stop; and a time spent at each landmark. The trip statistics can be stored as searchable data in a relational database. Identifying landmarks can include comparing geographical coordinates of the track path with known geographical coordinates of landmarks; based on a result of the comparing, determining landmarks located at a transverse distance smaller then a specified distance from each point of the track path; and displaying the determined landmarks based on a specified interest. The displayed landmarks can be listed. The acquisition times can be shifted by a time offset. The track path of the trip can include consecutive samples of geographical coordinates.

The subject matter described in this specification can be implemented as a method or as a system or using computer program products, tangibly embodied in information carriers, such as a CD-ROM, a DVD-ROM, a HD-DVD-ROM, a Blue-Ray drive, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

These implementations may provide various advantages. For instance, the processes described in this specification can generate trip-descriptors including a set of pictures taken during the trip matched to the track path of the trip. The trip-descriptor may further include trip statistics and other searchable trip information. Further, the processes disclosed here can suggest titles for trip-descriptors based on criteria relating to interest shown during the trip. Such interest can be expressed in terms of one or more landmarks visited during the trip, an inferred mode of transportation during the trip, number of pictures taken per landmark, duration of time spent per landmark, etc.

DESCRIPTION OF DRAWINGS

FIGS. 4A-4B show flow diagrams of example processes generating information relating to a trip.

DETAILED DESCRIPTION

Techniques and systems are disclosed for associating non-geographical information to points along track paths. Such non-geographical information typically includes items such as points of interest, names or other facts about buildings or other structures, and in any event may include essentially any information other than data designed to specify a location on Earth. Latitude and longitude coordinate pairs are an example of widely used geographical information. Among other things, the associated non-geographical information can be used to formulate meaningful labels for the track paths.

The techniques and systems disclosed in this specification can be implemented in the APERTURE® software (available from Apple, of Cupertino, Calif.) for associating meaningful labels to track paths.

Figure 1:
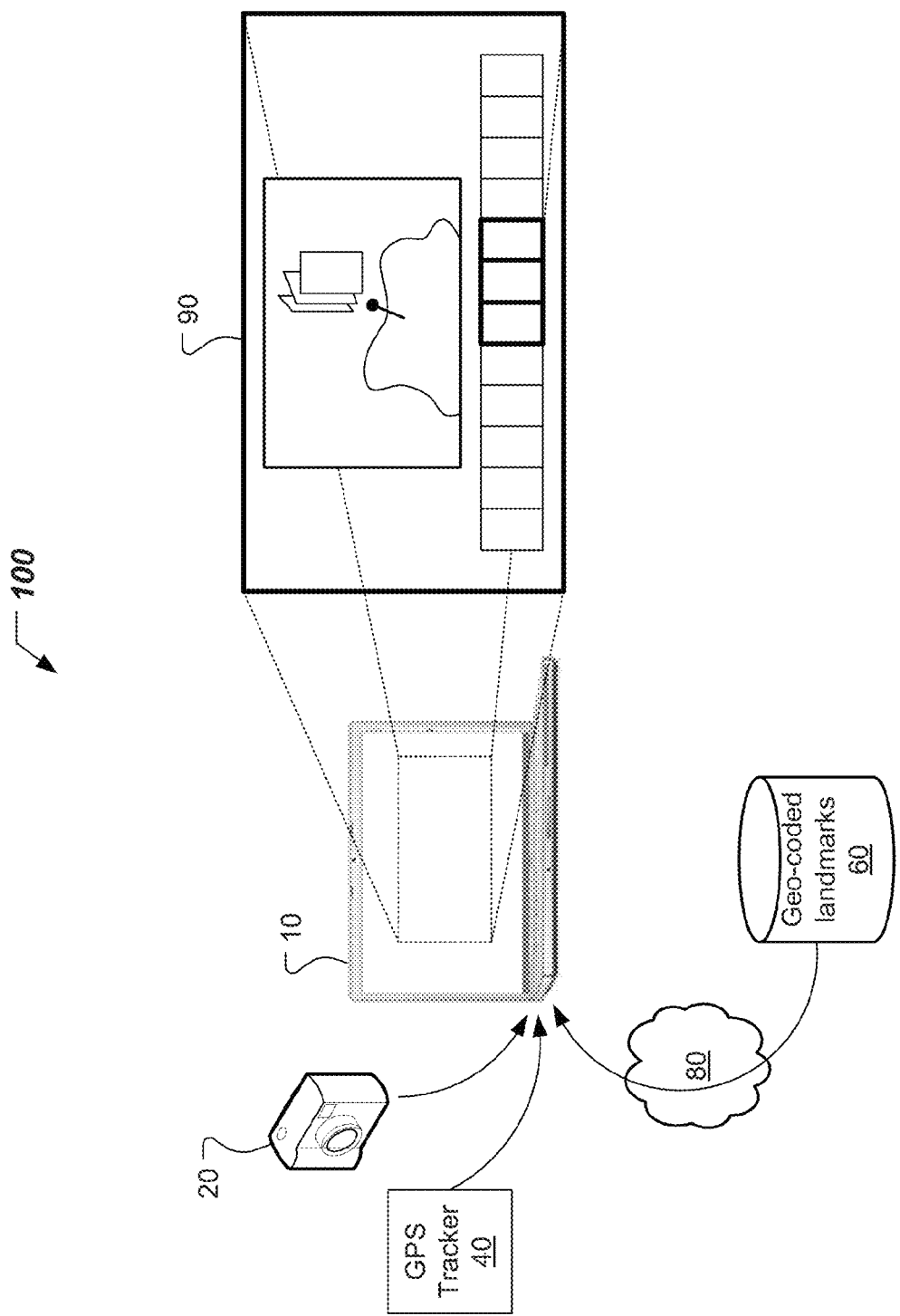
FIG. 1 shows a block diagram of an example system including a digital computer in communication with a digital camera, a Global Positioning System (GPS) tracker and a storage device storing geo-coded information.

FIG. 1 shows a block diagram of an example system 100 including a digital computer 10 in communication with a digital camera 20, a Global Positioning System (GPS) tracker 40 and a storage device storing geo-coded information 60.

The digital computer 10 can be a laptop computer, a workstation or a server computer. In some implementations, the digital camera 20, the GPS tracker device 40 and the storage device storing geo-coded information 60 can be coupled to the digital computer 10 using a variety of known technologies (e.g., USB, FireWire®, RS 232). In other implementations, the storage device storing geo-coded information 60 can be located remotely from the digital computer 10 and be operated by a network-based provider of geo-coded information. In such implementations, the digital computer can communicate with the storage device 60 via a communication network 80, e.g., the internet. The connection between the digital computer 10 and the network-based storage device 60 can be implemented as a wired or wireless network connection.

A software interface 90 of an application running on the digital computer 10 is configured to display inputs received from the digital camera 20, the GPS tracker device 40 and the storage device storing geo-coded information 60. In some implementations, the foregoing inputs may be received automatically, e.g., upon establishing a connection with the digital camera 20 and/or the GPS tracker device 40. In other implementations, the software interface 90 may be configured to receive instructions entered by the user. Such user instructions may be for requesting inputs from the connected digital camera 20 and/or GPS tracker device 40, and/or from the storage device storing geo-coded information 60. Other instructions entered by the user to the software interface 90 may be for selecting some or all of the displayed inputs (previously received from the connected devices). Finally, the software interface 90 can be configured to display outputs of a process implemented on the digital computer 10 for processing the inputs from the digital camera 20, the GPS tracker device 40 and the storage device storing geo-coded information 60. An example of such process can be implemented on system 100 as described in reference to FIG. 2.

Figure 2:
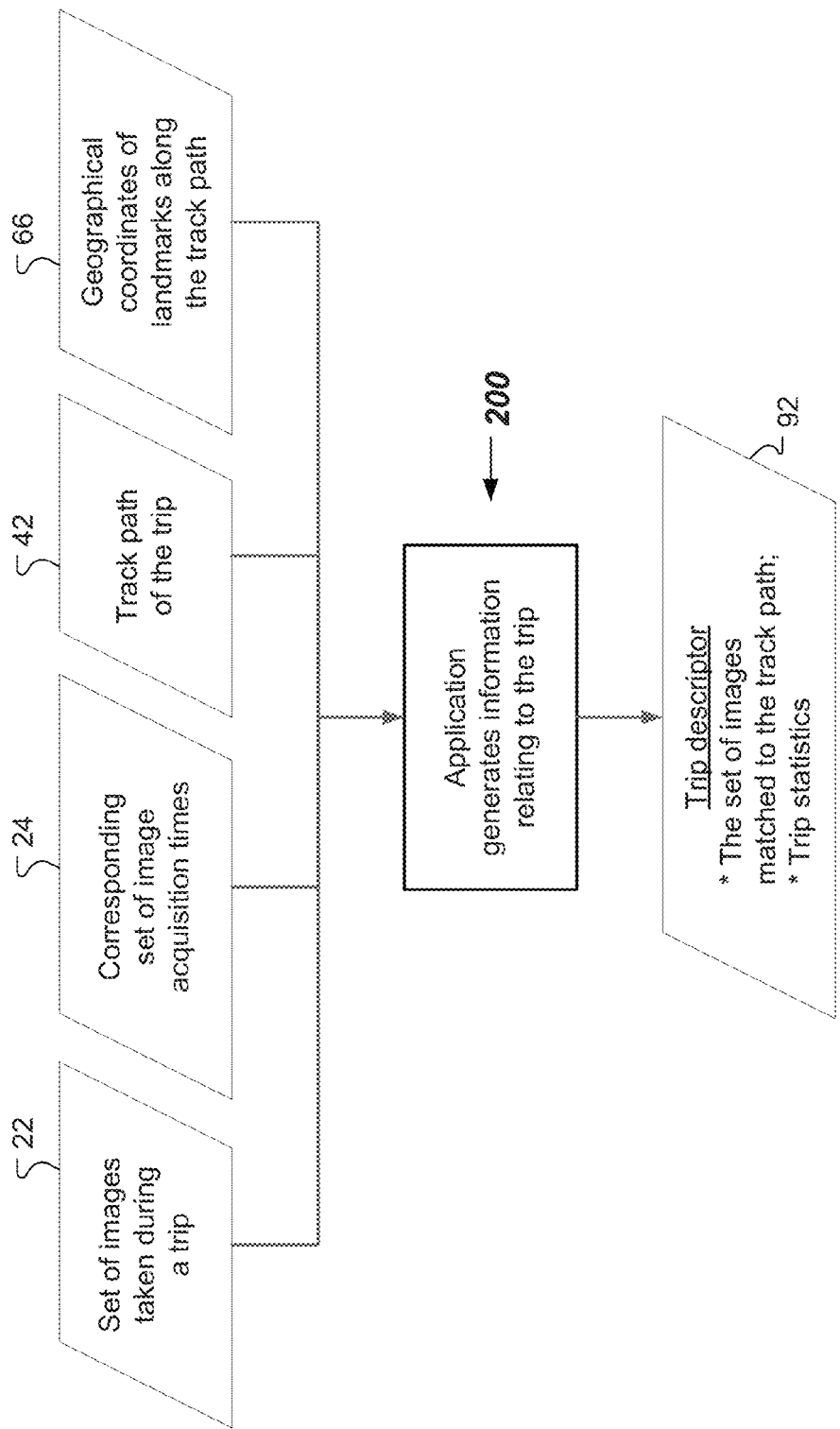
FIG. 2 shows a block diagram of an example process implemented at a digital computer for processing (i) a set of images taken during a trip, received from a digital camera, and (ii) a track path of the trip, received from a GPS tracker device, to generate information relating to the trip.

FIG. 2 shows a transfer-function diagram of an example process 200 implemented on a digital computer 10 for generating information relating to a trip.

The process 200 receives, from the digital camera 10, a set of images 22 taken during a trip. The set of images 22 may also be received from a storage device communicatively coupled to the digital computer 10.

The process 200 also receives a corresponding set of image acquisition times 24. In some implementations, the corresponding set of image acquisition times 24 can be received from the digital camera 20, in the form of metadata associated with the set of images 22. In such cases, the set of acquisition times 24 may be shifted by a time offset, e.g., with respect to a local standard time of at the start of the trip. In other implementations, when the set of images 20 is received from the digital camera 20 without the set of image acquisition times 24, the user may manually input the set of acquisition times 24. For example, for each one of the set of images 22, the user can type a corresponding acquisition time from notes taken during the trip. In another example, the user may import the corresponding set of image acquisition times 24 from a spreadsheet filled in during the trip.

The process 200 receives a track path of the trip 42 from the GPS tracker device 40. The track path 42 may also be received from a storage device communicatively coupled to the digital computer 10. In some implementations, the software interface 90 displays the received track path 42 overlaid on a map retrieved from the storage device storing geo-coded information 60.

A track path 42 may contain geographical coordinates along the trip acquired at irregular (usually random) time intervals during the trip. Alternatively, the track path 42 may contain a sequence of geographical coordinates acquired at times separated by a preset time interval. In some instance, the time for each acquisition of geographical coordinates can be recorded as well and made available together with the track path 42. For example, a smart phone configured with a GPS tracking interface can acquire the geographical coordinates of a location and can record the acquisition time based on the telephone network time. In other instances, a constant time interval between consecutive acquisitions may be known for the track path 42. For example, the GPS tracking device 40, including a GPS receiver and a timer, can be configured to acquire geographical coordinates every-so-many timer ticks. In some other instances, no time information is associated with a track path 42. For example, a hiker using the GPS tracking device 40 can acquire geographical coordinates along a trip at random time intervals without recording the acquisition times.

The process 200 receives, from a storage device storing geo-coded information 60, geographical coordinates 66 of landmarks along the received track path 42. In some implementations, additional information relating to the landmarks may be received together with the geographical coordinates 66 of landmarks along the received track path 42. Such additional information may include facts about the history of a landmark, recent news stories about the landmark, etc.

An application, implemented on the digital computer 10 and configured to receive inputs 22, 24, 42 and 66 relating to a trip, can use process 200 to generate information relating to the trip. The generated information can be packaged and stored in the form of a trip-descriptor 92. The trip-descriptor 92 can include trip statistics. The trip-descriptor 92 can further include the set of images 22 matched to the track path 42. These and other elements of the trip-descriptor 92 are disclosed later in this specification.

FIGS. 3A-3D are block diagrams showing aspects of an example implementation of a process for generating information relating to a trip. The process implemented in FIGS. 3A-3D may be process 200 described above, regarding FIG. 2.

The example implementation illustrated in FIGS. 3A-3D refers to the following example trip. A tourist departs Hotel A on a biking trip and returns one our later to Hotel A. The tourist wears a GPS tracking device to record a track path of the trip, and carries a digital camera to take pictures during the trip. Prior to the departure, the tourist turns on the GPS tracking device and takes a picture in front of Hotel A. The tourist bikes from Hotel A to Obelisk Park where she stops to take three pictures. The tourist bikes from Obelisk Park to the Temple where she stops to take five pictures. The tourist bikes from the Temple to the Cove where she slows down (but does not stop) and takes a picture of the Cove. The tourist continues biking from the Cove to Hotel A. Upon return to Hotel A, the tourist takes two more pictures in front of Hotel A and turns off the GPS tracking device. The set of twelve pictures acquired during the trip has corresponding acquisition times based on the digital camera's clock that is 15 minutes faster than the local standard time. The track path labeled Trk001.dat (default label given by the GPS tracking device) includes 3600 readings of geographical coordinates along the trip, corresponding to one reading per second. No absolute time information is associated with the track path. Upon returning from vacation, the tourist can use the system and processes described in this specification, e.g., process 200 in combination with system 100, to generate information relating to the trip.

Figure 3A:
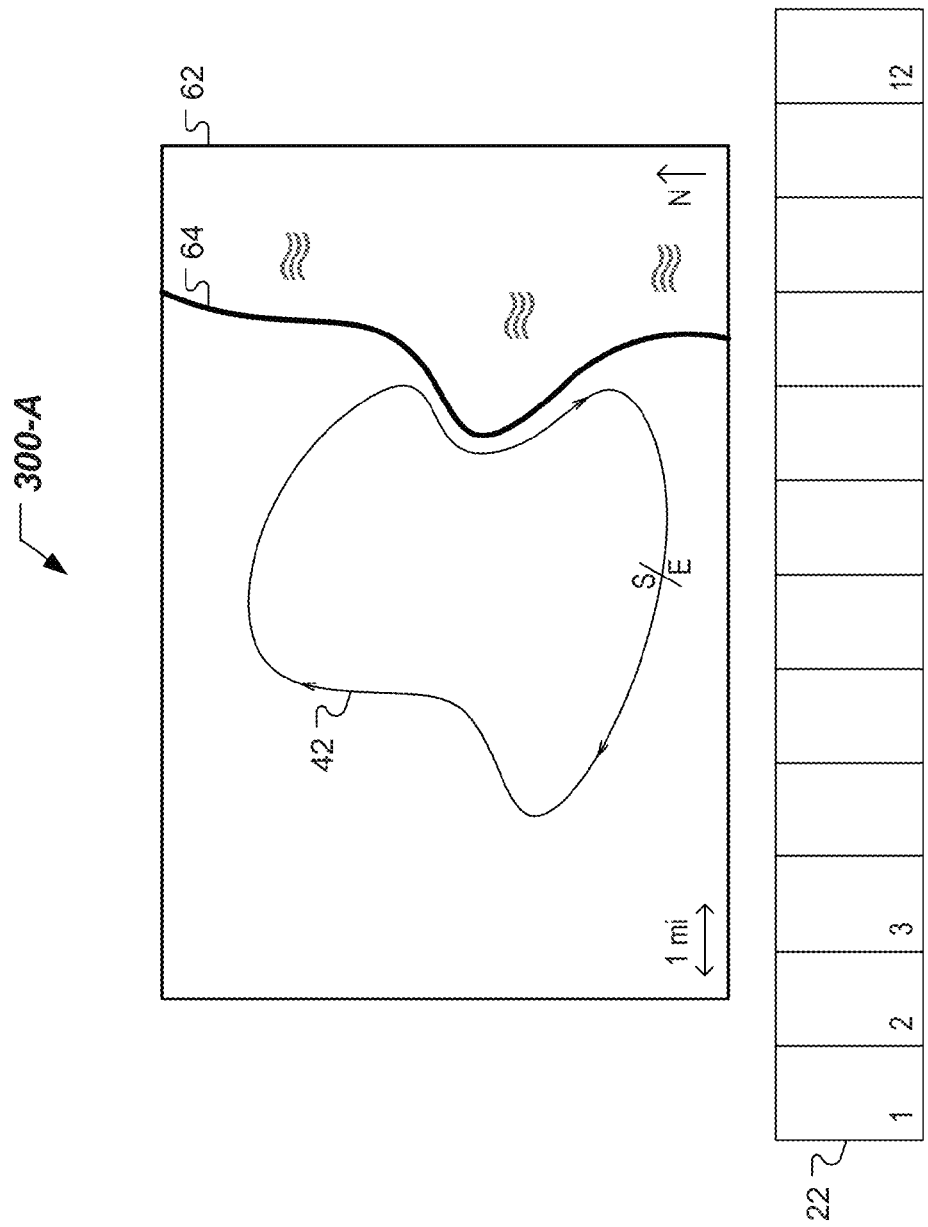
FIGS. 3A-3D are block diagrams showing aspects of an example implementation of a process for matching a set of images to a track path.

FIG. 3A shows a portion of a screenshot 300A, as displayed to the user by the digital computer 10, illustrating the set of pictures 22 received from the digital camera 20. The pictures are labeled 22-1, 22-2, ..., 22-12. The screenshot also illustrates the track path 42, received from the GPS tracker, overlaid on a map 62, retrieved from the storage device storing geo-coded information 60. In this example trip, the starting point (S) and the ending point (E) of track 42 coincide. The process can retrieve the map 62 based on geographical coordinates included in the track path 42. For example, a default map scale (displayed in the lower left corner of the map 62) can be such that the rectangle formed by the retrieved map 62 can overlap the track path 42 in its entirety. The map 62 can be a street map, a satellite map or a hybrid map. A shoreline 64 is illustrated on map 62, but other map details have been omitted for clarity.

There are no associations between the set of pictures 22 and the track path 42 for the process state shown in screenshot 300A. The user can instruct the process to identify landmarks near the displayed track path 42. To comply with the user's request, the process can identify landmarks based on two criteria.

A first criterion for identifying landmarks can specify that an identified landmark be located at a transverse distance smaller then a specified distance from each point of the track path. In some implementations, the user can set the predetermined distance to 25 m (the width of a 4-lane road). In other implementations, the predetermined distance can be 100 m (the length/width of a park lawn). In some other implementations, the predetermined distance can be 1 m. The later example, is equivalent to the requirement that the track path intersects the landmark location.

A second criterion for identifying landmarks can specify that a landmark be identified based on a specified interest. In some implementations, the landmarks can be parks and beaches (e.g., the Parks and Beaches of San Diego County, Calif.). In other implementations, the landmarks can have historical significance (e.g., the Capitol Building, the White House, etc., in downtown Washington D.C.) In some other implementations, the landmarks can be chosen based on interest in grunge music (locations significant to the life of Kurt Cobain in Seattle, Wash.).

Figure 3B:
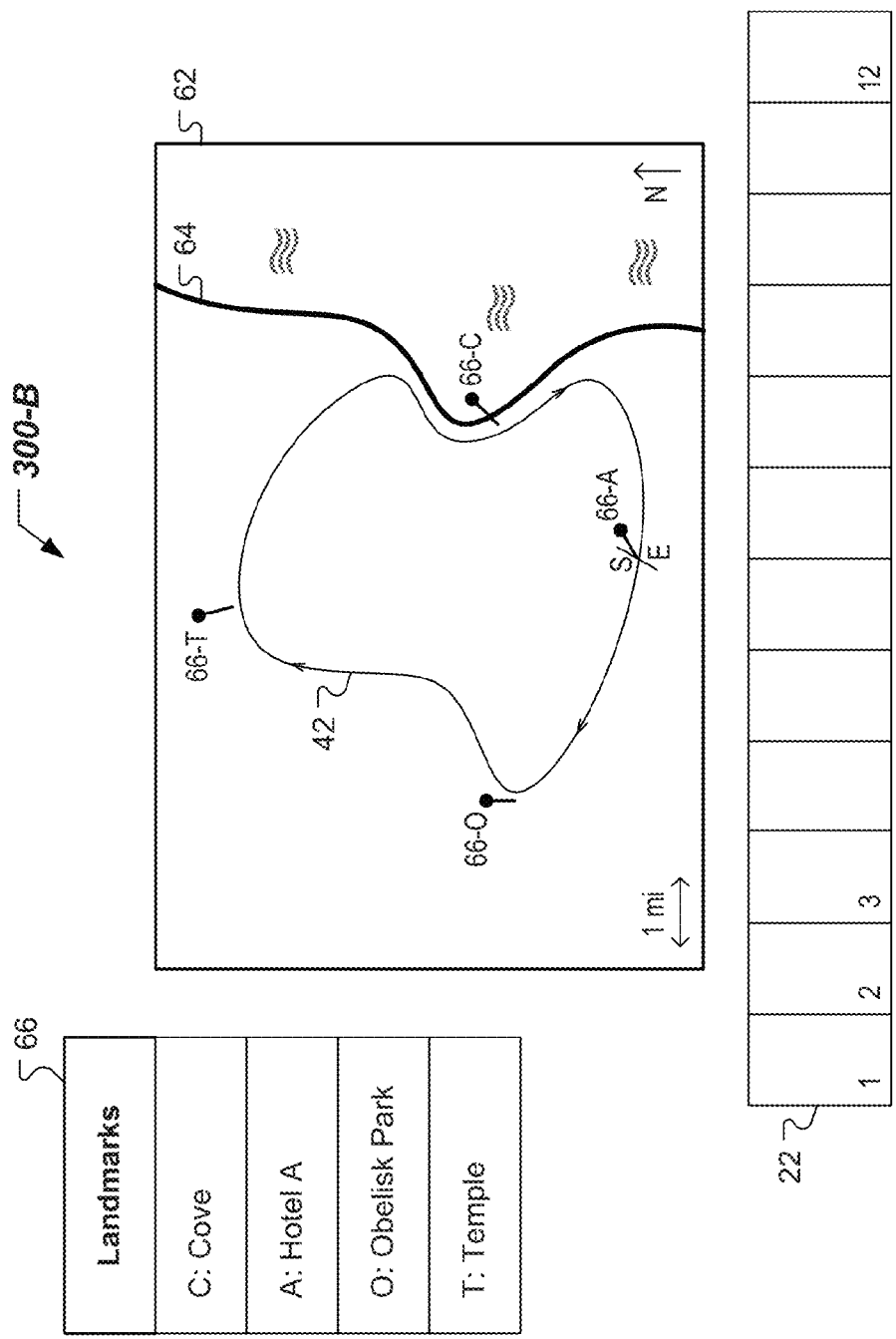

FIG. 3B shows a portion of a screenshot 300B, as displayed to the user by the digital computer 10, after identifying landmarks near the track path 42. The screenshot 300B illustrates the set of pictures 22, the track path 42 overlaid on the map 62, and the identified landmarks 66. The identified landmarks 66 can be displayed in a list (upper left side of screenshot 300B). The identified landmarks can also be displayed by markers overlaid on the map 62. For this example trip, the overlaid markers corresponding to the landmarks 66 are 66-A for Hotel A, 66-O for Obelisk Park, 66-T for The Temple and 66-C for the Cove.

For the process state shown in screenshot 300B, the identified landmarks 66 can be associated with the track path 42 as disclosed above. However, there are no associations between the set of pictures 22 and either the track path 42 or the landmarks 66. The user can select one of the set of pictures 22 and can also select an identified landmark corresponding to the selected picture. For example, the user can select picture 22-5 and can select the Temple 66-T. In response to receiving the user's selections, the process can associate the selected picture with the selected landmark. In some implementations, the user can select an identified landmark, say 66-T, by clicking the landmark marker, or by clicking the track path 42 nearest to the landmark marker, or by clicking a landmark item in the list of landmarks 66. In other implementations, the user can select an identified landmark, say 66-T, by dragging a selected picture onto the landmark marker or onto the track path 42 nearest to the landmark marker.

Figure 3C:
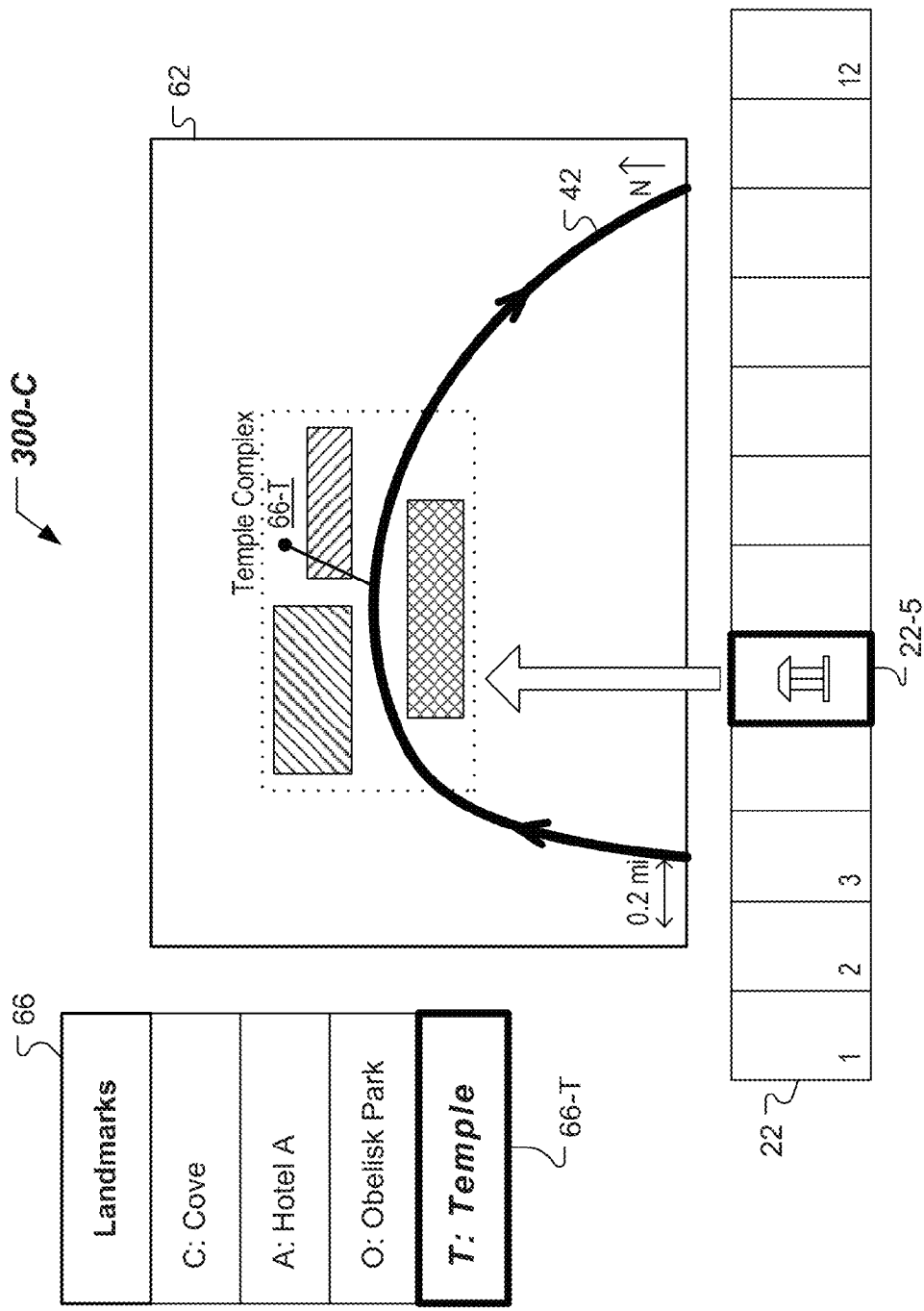

FIG. 3C shows a portion of a screenshot 300C, as displayed to the user by the digital computer 10, after receiving from the user, the picture selection and the landmark selection. The screenshot 300C can illustrate the set of pictures 22 including the selected picture 22-5, and the list of identified landmarks 66 including the selected landmark 66-T. In some implementations, upon selection of the landmark 66-T, the track path 42 can be seeked to a location nearest to the landmark 66-T, and the map 62 can be centered to and zoomed onto the location of landmark 66-T. For example, the map 62 illustrated in screenshot 300C can show more details corresponding to the selected landmark 66-T. For example, a layout of the Temple Complex 66-T is illustrated on map 62, while other map details are omitted for clarity.

In other implementations, the user can select one or more pictures prior to selecting an identified landmark corresponding to the one or more selected pictures. For example, the user can select two pictures 22-5 and 22-6 (or all 5 pictures 22-5:9) taken at the Temple 66-T, and can select the Temple 66-T. In this implementation, in response to receiving the user's selections, the process can associate the one or more selected pictures with the selected landmark. Based on the association disclosed above, the process can match the received set of pictures 22 to the received track path 42. It should be noted that the matching can be performed in various ways depending, for example, on time sampling of the track path 42. An example way to perform the matching of the received set of pictures 22 to the received track path 42 is described in reference to FIG. 5.

Figure 3D:
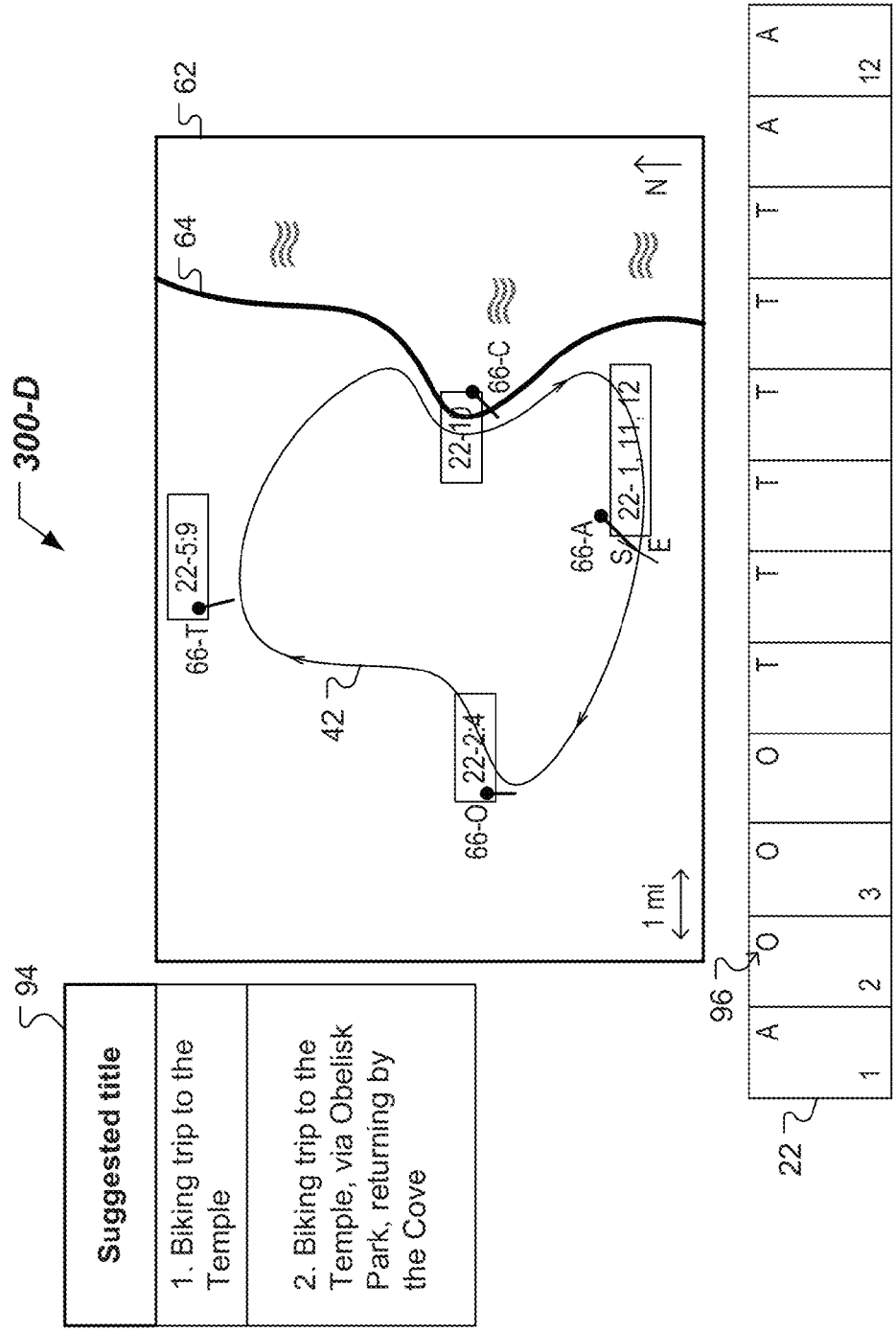

FIG. 3D shows a portion of a screenshot 300D, as displayed to the user by the digital computer 10, after matching the received set of pictures 22 to the received track path 42. The screenshot 300D can illustrate the set of pictures 22, the track path 42 overlaid on the map 62, and the identified landmarks 66.

For each one of the set of pictures 22 matched to the track path 42, the process can associate a picture with an identified landmark if the picture was acquired at a distance smaller then a predetermined distance from the identified landmark. For example, the process can associate a picture to an identified landmark if the picture was acquired at a location of the track path 42 situated at a distance of 100 m or less from the identified landmark (e.g., the associated picture was taken from across a park lawn from the landmark). In another example, the process can associate a picture to an identified landmark if the picture was acquired at a location of the track path 42 situated at a distance of 1 m or less from the identified landmark (i.e., the associated picture was taken at/inside the landmark and not nearby the landmark).

In some implementations, screenshot 300D can also indicate an associated landmark for each one of the set of pictures 22 matched to the track path 42. For example, picture 22-2 can be tagged 96 by an "O" corresponding to the associated landmark Obelisk Park 66-O. In other implementations, each identified landmark can be tagged by markers denoting the associated ones of the set of pictures 22 matched to the track path 42. For example, landmark Obelisk Park 66-O can be tagged by a marker reading "22-2:4" to identify the associated pictures 22-2, 22-3 and 22-4.

Finally, as described in FIG. 2, the process generates a trip-descriptor 92 to include the set of pictures 22 matched to the track path 42 and trip statistics. The trip statistics can include a total number of images taken during the trip, a number of images taken at each stop and a time spent at each stop. The trip statistics can also include one or more of landmarks associated with the trip, a number of images taken at each landmark, and a time spent at each landmark. For the example trip discussed in relation to FIGS. 3A-3D, the trip statistics include:

The total number of images taken during the trip=12;

The number of images taken at each stop (e.g., not counting the pictures taken in front of Hotel A)–number of images taken at Obelisk Park=3, number of images taken at the Temple=5;

The number of images taken at each landmark (e.g., not counting the pictures taken in front of Hotel A)–number of images taken at Obelisk Park=3, number of images taken at the Temple=5, number of images taken at the Cove=1;

The time spent at each stop (or landmark) can be calculated based on analyzing the track path 42. The time spent at each stop (landmark)=number of GPS samples acquired at the location of the stop (landmark) multiplied by the sample period. More details on track path sampling are presented in regard to FIG. 5.

The mode of transportation during the trip can be inferred from the track path 42. In some implementations, the rate along the track can be color coded and classified. For example, motion at a speed less then 2 mi/h may be may be classified as a walk, and the track path 42 may be colored red. For example, motion at a speed between 2-15 mi/h may be classified as a bike ride, and the track path 42 may be colored yellow. For example, motion at a speed larger then 15 mi/h may be classified as a drive (or ride in a motorized vehicle), and the track path 42 may be colored green.

In other implementations, for which rate color-coding is not available, the rate of the track path has to be analyzed prior to classifying. For example, the rate of the path track can be calculated as a ratio between the distance between two points on the path track and the number of samples multiplied by the sample period. The inferred mode of transportation during the trip can be included into the trip statistics.

The trip-descriptor 92 can be automatically labeled based on criteria reflecting interest along the trip. For example, a trip-descriptor title can be formulated in terms of at least an identified landmark. In another example, a mode of transportation during the trip can be inferred based on an average rate of the track path (as discussed above), then the trip-descriptor title can be formulated in terms of the inferred mode of transportation during the trip. Screenshot 300D illustrates a list of proposed trip-descriptor titles 94 formulated based on the prior examples.

In some implementations, the labeling of the trip-descriptor is based on determining an identified landmark having a largest number of associated images, and formulating the trip-descriptor title in terms of the determined landmark.

In other implementations, the labeling of the trip-descriptor is based on determining an identified landmark having associated images taken over a longest time interval, and formulating the trip-descriptor title in terms of the determined landmark.

Once generated, the trip-descriptor 92 can be stored for future use. For example, the set of images 22 matched to the track path 42 can be saved on a storage device communicatively coupled to the digital computer 10. Further, the trip statistics and pointers to the stored set of images can be stored as searchable data in a relational database. The searchable database can be available locally on the digital computer 10. Alternatively or additionally, the searchable database can also be hosted online, remote from the digital computer 10.

FIGS. 4A and 4B show flow diagrams of example processes for matching a set of images to a track path. In some implementations, process 400 is performed at a digital computer, and begins when receiving 410 a set of pictures taken during a trip, from a digital camera, and a track path of the trip, from a GPS tracking device. Next, a list of landmarks near the track path is presented 420 to the user. In response to receiving user's selections, associate 430 at least a selected one of the set of pictures with a selected one of the listed landmarks. The set of pictures and the track path are matched 440 based on the association.

In some implementations, process 450 begins when the digital computer generates 460 a trip-descriptor including (i) the set of pictures taken during the trip matched to the track path of the trip, and (ii) trip statistics. The trip-descriptor is labeled 470 based on criteria reflecting interest along the trip.

Figure 5:
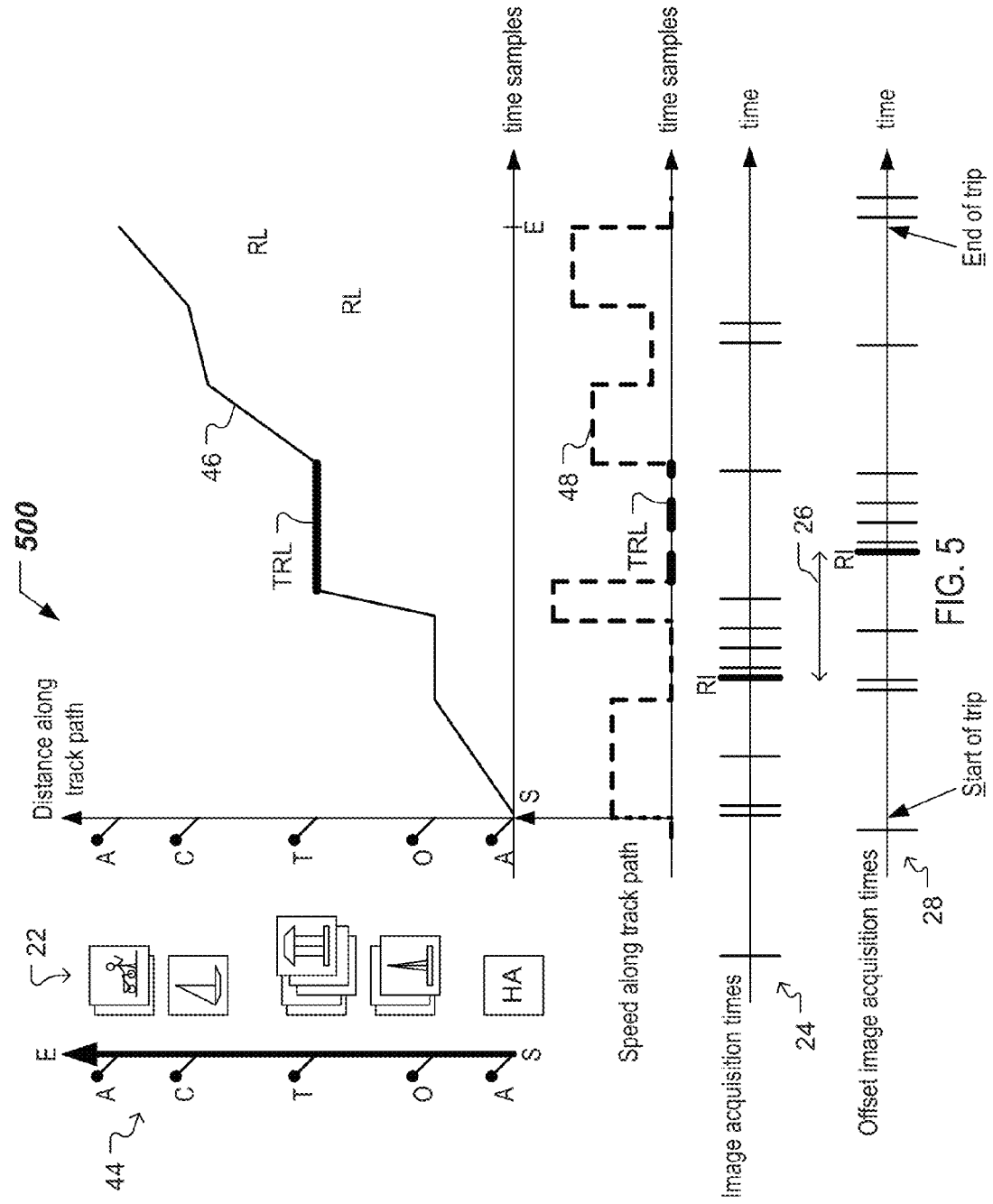
FIG. 5 is a schematic showing an example technique for matching a set of image acquisition times to a track path.

FIG. 5 is a schematic showing an example technique for matching a set of image acquisition times to a track path. The matching 500 described in FIG. 5 can be implemented in the process disclosed above in reference to FIGS. 3A-3D, and/or in reference to FIGS. 4A-4B. Further, the example trip discussed in reference to FIGS. 3A-3D is also used in FIG. 5.

The track path 42 of the trip can be represented as a distance measured along the track path 42 from the start of the trip S. (This representation is illustrated as line 44). The landmarks identified for the track path 42 and associated to the set of pictures 22 are represented by the tags A, O, T, and C, respectively. The foregoing tags are placed at the appropriate locations along arrow 44. The associated ones from the set of pictures 22 are displayed near the corresponding landmark tags.

The track path 42 of the trip can be represented as a distance measured along the track path 42 from the start of the trip S as a function of the time samples (This representation is illustrated as a curve 46). Notably, in this representation 46, the distance from the start of the trip to a given landmark stays constant while the tourist is visiting the given landmark. For example, the portion of curve 46 is constant for a number of time samples (TRL) acquired while the tourist is visiting landmark T.

Further, the rate of track path 42 of the trip can be represented as a speed along the track path 42 as a function of the time samples. (The speed is illustrated as a curve 48). Notably, an average speed is zero while the tourist is visiting a given landmark. For example, the portion of curve 48 remains zero for a number of time samples (TRL) acquired while the tourist is visiting landmark T.

The track path 42 was acquired at a sample period of 1 second. (3600 samples/hour.) Thus, for this example trip, the horizontal axes corresponding to time samples of curves 46 and 48 correspond to time (measured in seconds.) In other examples, the curves 46 and 48 can be stretched or compressed along the horizontal axis by a factor equal to the number of samples per second. For example, if 2 samples of geographical coordinates are taken every second, the curves 46 and 48 can be compressed along the horizontal axis by a factor of 2 to convert the horizontal axis from time samples to time (measured in seconds). For example, if 1 sample of geographical coordinates is taken every 10 seconds, the curves 46 and 48 are stretched by a factor of 10 to convert the horizontal axis from time samples to time (measured in seconds).

The set of image acquisition times 24 introduced above regarding FIG. 2 can be aligned to the curves 46 and 48 once the horizontal axes have been converted to time (in seconds). To match (in time) the set of image acquisition times 24 to the track path 46, a time offset can be determined to shift the set of image acquisition times 24 by that offset. The user can select a picture, e.g., 22-5, and can select the landmark the picture was taken at, e.g., the Temple 66-T. (see FIG. 3C.) In some implementations of the matching technique 500, the selected picture 22-5 can be identified as the reference image (RI), and the selected landmark can be identified as the reference landmark (RL). The time offset 26 can be determined such that the acquisition time of RI falls within the time interval TRL spent by the tourist at RL. Then, finer adjustments can be performed to obtain a largest number of pictures acquired during for each identified landmark.

The offset set of image acquisition times 28 corresponds to the matched set of images 22 taken during the trip matched to the track path 42 of the trip. Based on the matching technique 500 described above, the pictures determined to have been acquired while the tourist was visiting an identified landmark are being automatically associated with that landmark.

Figure 6:
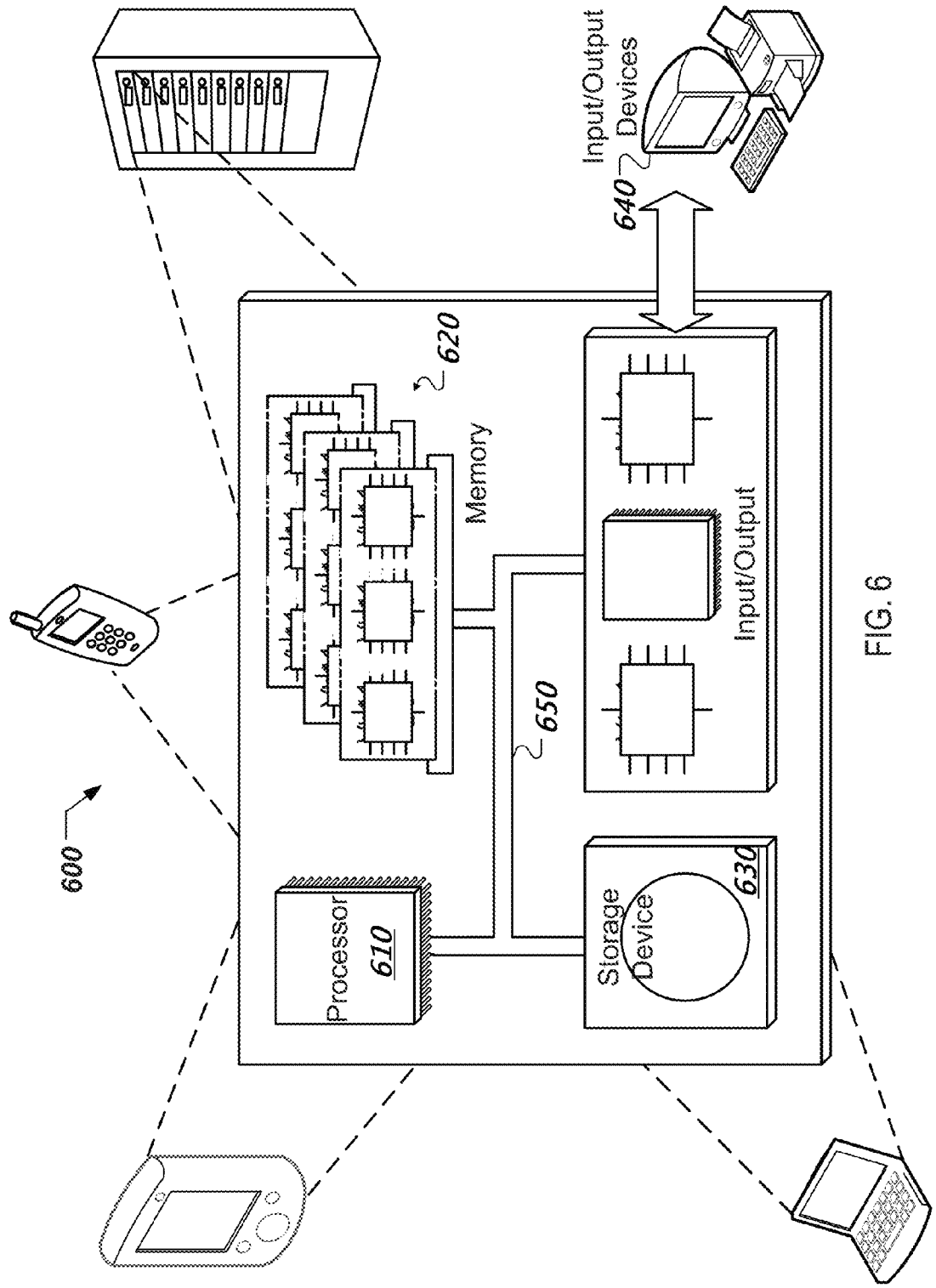
FIG. 6 shows a schematic of a computer system representing various forms of digital computers.

FIG. 6 shows a schematic diagram of a computer system 600 representing the digital computer 10. Also the computer system 600 can represent a storage computer storing geocoded information 60. The system 600 can be used for the operations described in association with any of the computer-implement methods described previously, according to one implementation. The system 600 is intended to include various forms of digital computers, such as laptops, desktops, workstations, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

Aspects of the subject matter and the functional operations described in this specification can be implemented in digital electronic circuitry, or in computer software, firmware, or hardware, including the structures disclosed in this specification and their structural equivalents, or in combinations of one or more of them. Aspects of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, a portable electronic device, a server, or multiple processors, portable electronic devices and servers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular implementations of particular aspects. Certain features that are described in this specification in the context of separate aspects can also be implemented in combination in a single aspect. Conversely, various features that are described in the context of a single aspect can also be implemented in multiple aspects separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method performed by an application executing on a computer system, the method comprising:
   receiving a set of images from a first device, each image having a corresponding acquisition time;
   receiving a set of location data from a second device, the location data captured contemporaneously with the set of images;
   identifying a path based, at least in part, on the location data;
   identifying one or more landmarks near the path;
   associating images in the set of images with the one or more landmarks; and
   matching the set of images to the identified path based, at least in part, on the association.

2. The method of claim 1, further comprising:
   generating, based at least in part on the identified path, a trip-descriptor that includes trip statistics; and
   labeling the trip-descriptor based, at least in part, on a specified interest in the path.

3. The method of claim 2, further comprising formulating a trip-descriptor title based, at least in part, on an identified landmark.

4. The method of claim 2, wherein the trip-descriptor further includes the set of images matched to the path.

5. The method of claim 4, further comprising:
   aggregating the set of images matched to the path and the trip statistics into a trip-descriptor data structure on a storage device; and
   storing pointers to the trip-descriptor data structure in a relational database.

6. The method of claim 2, further comprising associating each image in the set of images matched to the path with an identified landmark if the image was acquired at a distance smaller then a predetermined distance from the identified landmark.

7. The method of claim 2, further comprising:
   identifying a popular landmark from the one or more landmarks having a largest number of associated images; and
   formulating a trip-descriptor title based, at least in part, on the identified popular landmark.

8. The method of claim 2, further comprising:
   identifying a popular landmark from the one or more landmarks having associated images taken over a longest time interval; and
   formulating a trip-descriptor title based, at least in part, on the identified popular landmark.

9. The method of claim 2, further comprising:
   inferring a mode of transportation based, at least in part, on an average rate of motion along the path; and formulating a trip-descriptor title based, at least in part, on the inferred mode of transportation.

10. A non-transitory computer readable medium encoded with a computer program, the program comprising instructions that when executed by a data processing apparatus cause the data processing apparatus to:
receive a set of images from a first device, each image having a corresponding acquisition time;
receive a set of location data from a second device, the location data captured contemporaneously with the set of images;
identify a path based, at least in part, on the location data;
identify one or more landmarks near the path;
associate images in the set of images with the one or more landmarks; and
match the set of images to the identified path based, at least in part, on the association.

11. The non-transitory computer readable medium of claim 10, wherein the program further comprises instructions that when executed by a data processing apparatus cause the data processing apparatus to:
generate, based at least in part on the identified path, a trip-descriptor that includes trip statistics; and
label the trip-descriptor based, at least in part, on a specified interest in the identified path.

12. The non-transitory computer readable medium of claim 11, wherein the instructions that cause the data processing apparatus to label the trip-descriptor comprise instructions that cause the data processing apparatus to:
identify a time spent at each of the one or more landmarks based, at least in part, on the acquisition time for each associated image;
identify a popular landmark from the one or more landmarks at which a largest amount of time was spent; and
formulate a trip-descriptor title based, at least in part, on the identified popular landmark.

13. The non-transitory computer readable medium of claim 11, wherein the instructions that cause the data processing apparatus to generate the trip-descriptor comprise instructions that cause the data processing apparatus to:
aggregate a set of images matched to the path and the trip statistics into a trip-descriptor data structure on a storage device; and
store pointers to the trip-descriptor data structure in a relational database.

14. The non-transitory computer readable medium of claim 11, wherein the trip statistics comprise one or more of:
one or more landmarks associated with the path;
an inferred mode of transportation along the path;
a total number of images in the set of images;
a number of images taken at each of one or more stops along the path;
a number of images associated with each of the one or more landmarks;
an amount of time spent at each of the one or more stops; and
an amount of time spent at each of the one or more landmarks.

15. The non-transitory computer storage medium of claim 10, wherein the instructions that cause the data processing apparatus to identify one or more landmarks comprise instructions that cause the data processing apparatus to:
compare geographical coordinates of the path with known geographical coordinates of a set of landmarks;
identify, based at least in part on the comparing, one or more landmarks from the set of landmarks that are located at a transverse distance smaller than a specified distance from the path; and
display the one or more landmarks based on a specified interest.

16. The non-transitory computer readable medium of claim 15, wherein the program further comprises instructions that when executed by the data processing apparatus cause the data processing apparatus to list the displayed landmarks.

17. The non-transitory computer readable medium of claim 10, wherein the acquisition time for each image is shifted by a time offset.

18. The non-transitory computer readable medium of claim 10, wherein the path comprises consecutive samples of geographical coordinates.

19. A system comprising:
at least one display device;
at least one processor and storage configured to store instructions that are operable, when executed by the processor, to cause the system to perform operations comprising:
receiving a set of images from a first device, each image having a corresponding acquisition time;
receiving a set of location data from a second device, the location data captured contemporaneously with the set of images;
identifying a path based, at least in part, on the location data;
identifying one or more landmarks near the path;
associating images in the set of images with the one or more landmarks; and
matching the set of images to the identified path based, at least in part, on the association.

* * * * *